Dec. 19, 1933.  J. SNEED  1,940,466
TIE ROD
Filed July 16, 1928
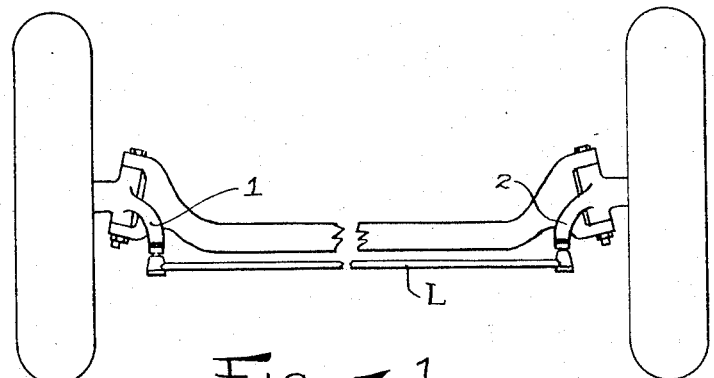
Fig.-1
Fig.-2
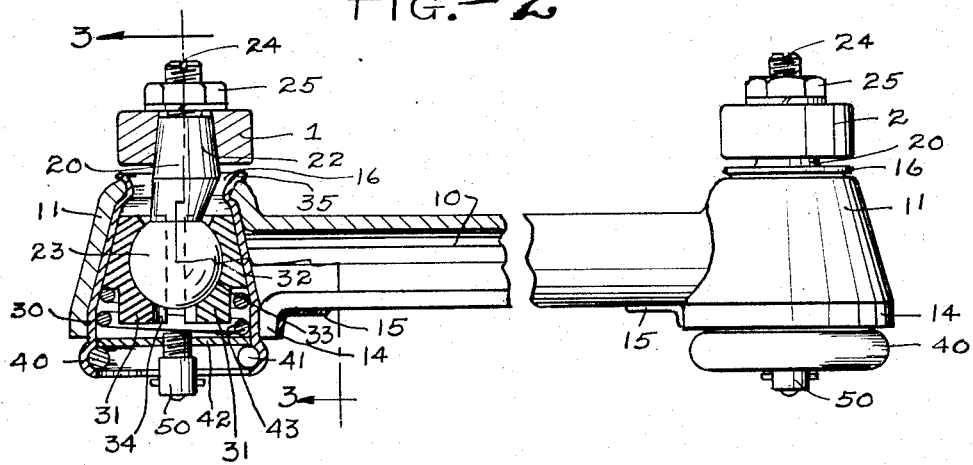
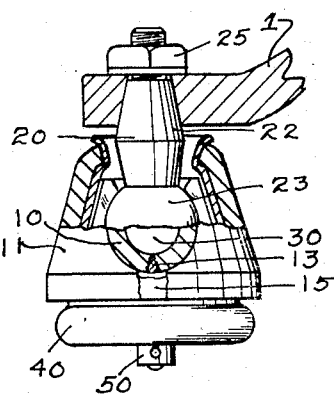
Fig.-3
Inventor
John Sneed
By Bates, Macklin, Godrick & Teare
Attorneys Patented Dec. 19, 1933

1,940,466

UNITED STATES PATENT OFFICE 1,940,466

TIE ROD

John Sneed, Ferndale, Mich., assignor, by mesne assignments, to Thompson Products, Incorporated, Cleveland, Ohio, a corporation of Ohio Application July 16, 1928. Serial No. 293,108

7 Claims. (Cl. 287—90)

This invention relates to links or tie rods and particularly to an improved bushing or bearing construction for the ends of the rod.

In my copending application filed herewith I have illustrated and described a link and the method of forming same which consists essentially in a pressed metal body part with integrally formed ends which ends generally speaking form sockets within which are secured means for engaging external agencies, such for instance, as the steering arms of a motor vehicle.

It is among the objects of my invention to arrange the parts carried at the end of a link or tie rod to facilitate universal engagement with external agencies; to facilitate lubrication for the wearing parts; to automatically compensate for wear without changing the effective length of the link or tie rod; to distribute the load and the thrust from the connected members to the body of the link evenly and without subjecting certain parts to greater stresses than others; to simplify the design so that the assembly may be more rapid and that replacement or change may be more easily effected. A more specific object is to arrange a split bushing with conical seats and spherical bearing surfaces in the ends of the link for engaging external agencies.

Other objects will appear from the following description of a preferred embodiment of my invention, reference being had to the accompanying drawing. The essential characteristics are summarized in the claims.

In the drawing, Fig. 1 is an illustrative embodiment of one application of my link or tie rod; Fig. 2 is a partially broken longitudinal section of a link including the parts at the ends thereof; and Fig. 3 is a section taken along the line 3—3 of Fig. 2.

Referring to the drawing, there is illustrated in Fig. 1 an application of my link L as a tie rod extending between steering arms 1 and 2 and operatively connecting the swiveling wheels of a motor vehicle. By reason of the cant of the king pins of the vehicle, it is desirable that a universal connection be arranged between the ends of the link and the ends of the steering arms and to that end, I provide ball and socket connections at those points. To facilitate alignment between the wheels the effective length of the link may be varied by offsetting the shanks of the balls, see Fig. 2, so that the position of the shanks of the balls in the ends of the steering arms determine the distance between the ends of the arms. This relationship is described in my copending application.

Referring particularly to Figs. 2 and 3 the link or tie rod L may have a tubular body portion 10 with integrally formed cupped ends 11 and 12. Preferably the link or tie rod may be pressed from sheet stock in a manner similar to that disclosed in my copending application, which consists briefly in a two step operation of first pressing a blank into a central channel with partially formed cupped ends and then taking the piece and forcing it into a die which curves over the side flanges of the channel to form a tubular middle part and closes the brims of the cupped ends. A seam remains where the edges of the channel are forced together as at 13, which seam extends along the bottom of the tubular part, as illustrated, and axially along the inner edges of the brims of the cupped parts as at 14. In completing the body of the link I prefer to weld the seam particularly at the ends, as at 15.

The cupped ends are formed as truncated cones with depending cylindrical extensions which may be easily drawn and which present uniformly inclined surfaces inside of the cups. The upper surfaces or bases of the cupped ends have holes punched as at 16.

In using my link as a tie rod between the steering arms of a motor vehicle, intermediate connecting members comprising ball studs 20 and 21 are adjustably fixed in the ends of the steering arms and are universally connected in the ends of the tie rod. The members 20 and 21 may be of similar configuration and may be similarly associated with respective steering arms. The member 20 has a tapered shank 22 and has a spherically formed end 23. The tapered shank is offset from the center of the spherical part or ball 23 so that the spacing of the ends of the steering arms may be varied by setting and securing the shank in various positions in the end of the steering arm. The ends of the members 20 and 21 may have threaded extensions which are slotted as at 24. The members are secured in the steering arms by such means as nuts 25.

Generally speaking, the cupped ends 11 and 12 may be regarded as sockets for receiving the balls and I provide bushing and bearing members to be carried within the cupped ends to support the balls. In the end member 11 is inserted a sleeve 30 which may be pressed into the end member to closely fit the inner walls thereof. As also appears in Fig. 3, the sleeve 30 closes the opening which leads to the tubular part 10 and supports the balls particularly when the link is in compression. The upper end of the sleeve 30 extends through the hole or aperture 110

16 and is expanded or peaned over the periphery of the aperture as at 35 so that the sleeve is held against axial movement relative to the cupped end of the link.

Within the sleeve 30 is carried a split bushing 31 which has outer conical surfaces 32 closely fitting the inner surface of the sleeve. The bushing has inner spherical surfaces engaging the ball as at 33. The lower portion of the sleeve 30 depends below the bottom of the cupped end of the link as at 40 and is deformed to receive a snap ring 41 which secures a closure member 42 in the bottom thereof. A spring 43 is compressed between the closure member and split bushing and tends to force the bushing upwardly in the sleeve and compress its part upon opposite sides of the ball, thus compensating for wear between the ball and bushing and insuring a snug fit at all times.

The bottom of the bushing may have a central aperture 34 through which a drift pin or other means may contact with the bottom of the ball 23 so that the whole member 20 may be driven into place in the steering arm. Through this same aperture in the split bushing lubricant may be forced on the ball. A lubricating connection 50 may be threaded in the closure member 42. It is to be noted that a chamber is provided above the closure member 42 in which a quantity of lubricant may be forced and stored.

From the foregoing it will appear that a link or tie rod constructed according to the precepts of my invention has in addition to the advantages described in my copending application, a bushing and bearing arrangement which insures long life and satisfactory use of the apparatus; that even as the parts wear the effective distance between the ends of the steering arms will remain constant; that load is efficiently distributed both in tension and compression from the ball member to the body of the link; that the whole mechanism comprises a few simple parts which can be cheaply made and readily assembled, and that while modifications of the preferred form of my invention may occur to those skilled in the art, I do not care to be limited in the scope of my patent other than by the claims appended hereto.

I claim:—

1. The combination of a tie rod having an integrally formed cup-shaped end with conically formed interior surfaces and comprising generally a socket of a ball and socket joint and having a circular aperture at the end toward which the walls converge, a conical sleeve having a part extending through the aperture and peaned over the periphery thereof, and a member having a ball part secured in said socket, and a bushing split in the plane of the axis of the cone defined by the interior walls of said cupped end, said bushing having conically formed exterior surfaces engaging said sleeve and spherically formed interior surfaces engaging said ball part.

2. The combination of a tie rod, a conically formed sleeve secured at one end of said tie rod and disposed at right angles thereto, said sleeve having a relatively small opening at one end and a relatively large opening at the other end and having an inwardly facing annular groove formed near the larger end of said sleeve, a snap ring disposed in said groove, a closure member supported above said snap ring, a coil spring bearing upon said closure member, a split bushing engaged by said spring and having parts on opposite sides of the plane of the axis of said sleeve and having exterior conical surfaces engaging the inner walls of said sleeve, said seats adapted to journal an element therebetween.

3. A link or tie rod having an end part with openings in opposite sides thereof, a conically formed sleeve carried in said end part and extending at right angles to the tie rod and extending through both of said openings and having a greater diameter than the openings at points immediately beyond each of them, a member having a spherically formed end adapted to be secured in said sleeve, a split bushing engaging said spherically formed end and supported by said sleeve, a closure member secured in one end of said sleeve, and resilient means disposed between said closure member and said bushing.

4. The combination of a tie rod, a conically formed sleeve secured at one end of said tie rod and disposed at right angles thereto, said sleeve having a relatively small opening at one end and a relatively large opening at the other end, an inwardly facing annular groove formed near the larger end of said sleeve, a snap ring disposed in said groove, a closure member supported above said snap ring, and means supported between the inclined walls of the sleeve and the closure member for engaging external agencies.

5. In a ball and socket joint, a socket casing, a connecting rod, means for attaching said casing to the rod, a second rod having a ball end disposed within said casing, bearing seats journalling said ball within the casing, said bearing seats disposed on converging surfaces of the casing, a cover plate disposed in one end of the casing, a coil spring between said plate and said seats, said casing having an annular groove formed internally thereof on the outside of the plate, and a circular wire clip, under outward tension, sprung into said groove.

6. In a ball and socket joint, a tubular member providing at one end thereof an integrally formed open ended socket having converging inner walls, a sleeve within said socket and extending beyond the ends thereof, a portion of said sleeve conforming and in contact with the inner walls thereof, one extended end portion of said sleeve being turned over one end of said socket walls, the other extended portion of said sleeve being bent outwardly to form an annular beading beyond the corresponding end of said socket end walls, a closure member within said socket and means cooperating with said beading to lock said closure member in position in said socket.

7. In a ball and socket joint, a tubular member providing at one end thereof an integrally formed open ended socket having converging inner walls, a sleeve within said socket and extending beyond the ends thereof, a portion of said sleeve conforming and in contact with the inner walls thereof, one extended end portion of said sleeve being turned over one end of said socket walls, the other extended portion of said sleeve being bent outwardly to form an annular beading beyond the corresponding end of said socket end walls, a closure member within said socket and a split ring confined within said beading to retain said closure member in position.

JOHN SNEED.